April 9, 1968 B. M. BAKER ET AL 3,376,949
WATER HAMMER MARINE SEISMIC SOURCE
Filed Dec. 8, 1966
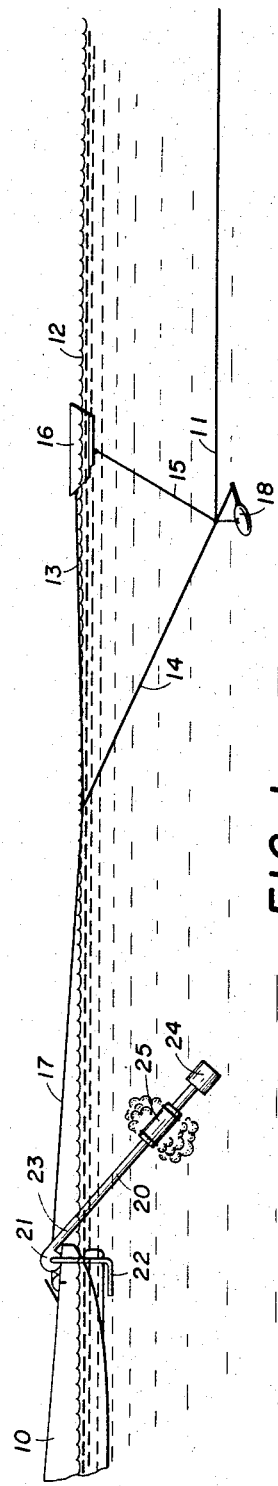
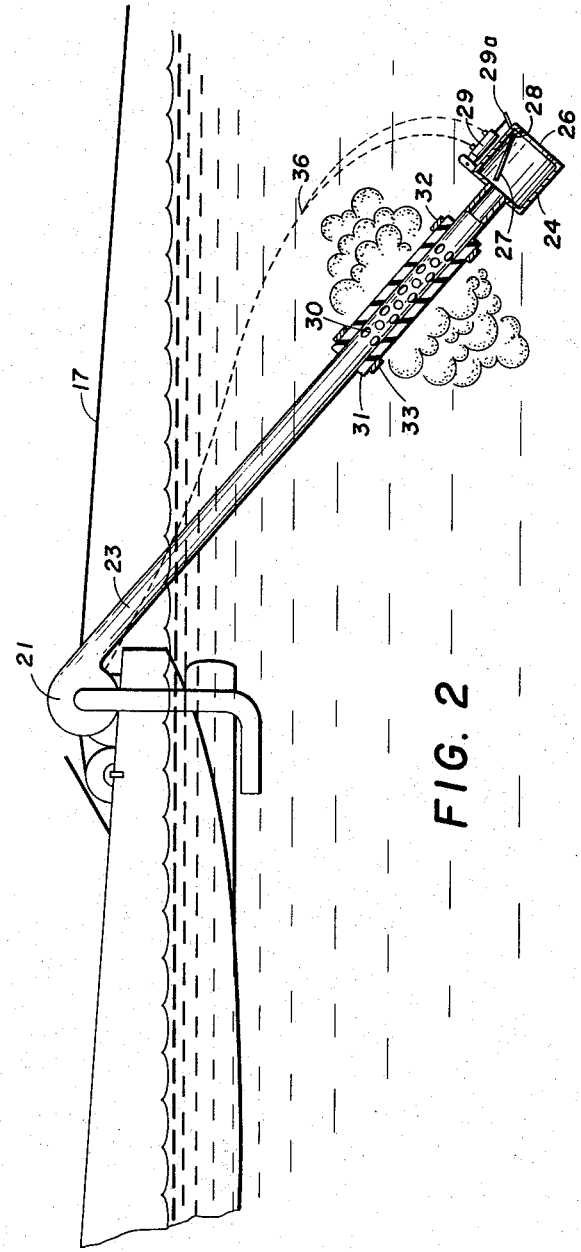
INVENTOR
BUFORD M. BAKER
JAMES H. WAUGH, JR.
D. Carl Richards
ATTORNEY United States Patent Office 3,376,949
Patented Apr. 9, 1968

3,376,949
WATER HAMMER MARINE SEISMIC SOURCE
Buford M. Baker, Dallas, and James H. Waugh, Jr.,
Coppell, Tex., assignors to Texas Instruments Incorporated, Dallas, Tex., a corporation of Delaware
Filed Dec. 8, 1966, Ser. No. 600,102
4 Claims. (Cl. 181—.5)

ABSTRACT OF THE DISCLOSURE

A marine seismic detector streamer moves along a traverse for detecting seismic energy with a source vessel which employs a pump for directing a high energy flow of water along a confined course, at least a portion of which is submerged in the water with a valve abruptly terminating such flow of water to form a classical water hammer. A resilient sealed perforated section along the flow course provides for transmission of water hammer energy to generate seismic waves.

---

This invention relates to the generation of acoustic energy in a marine environment, and more particularly, to a water hammer system for generating seismic energy for marine seismic exploration.

In conducting seismic exploration in marine areas, it has been the practice to generate seismic waves by the detonation of an explosive charge. The character of the energy and the inefficiency of the utilization of the energy involved has led to the search for systems which are more efficient and which are more readily controllable as to frequency and amplitude.

The present invention is directed to a seismic source in which the amplitude as well as the frequency content of the resultant seismic waves may be controlled. The invention involves the use of a structure in which the energy in a moving stream of liquid will be employed to produce the desired seismic waves.

More particularly, in accordance with the invention, there is provided a source vessel which is adapted to be maintained in a predetermined relation to a seismic traverse and adapted for movement along such traverse. Structure supported by the vessel forms a water hammer which is coupled to the water adjacent to the vessel. Means are provided for periodically actuating the water hammer to impart energy to the water for travel to and from subsurface formation. In a more specific aspect, the system involves directing a high energy flow of water along a course at least a portion of which is submerged in the water body to be excited. Valve means are employed to terminate the flow abruptly in the region of the termination of the flow path. A means located at submerged points along the path provides for escape of fluid flow energy to produce seismic waves in the marine environment.

For a more complete understanding of the present invention and for further objects and advantages thereof, reference may now be had to the following description taken in conjunction with the accompanying drawings in which:

FIGURE 1 illustrates a marine seismic exploring system involving the present invention, and FIGURE 2 is an enlarged view of the source of FIGURE 1 with parts thereof shown in section.

Referring now to FIGURE 1, a boat 10 is employed in marine seismic operations to carry out several functions, including the trailing of a seismic streamer 11 along a selected seismic traverse. This streamer 11 is maintained at a predetermined depth below the surface 12 by means of a harness comprising lines 13, 14 and 15. The line 15 couples a float 16 to the lead end of the streamer 11.

Line 13 couples the float 16 to a tow line 17. Line 14 couples the tow line 17 to the lead end of the streamer 11. A vane or weight element 18 suspended from the float 16 by means of line 15 serves to control the depths of the streamer 11.

The tow line 17 is connected to a suitable winch on the boat 10. In practice, a boat such as boat 10 is moved along the selected traverse. While the boat moves, seismic waves are periodically generated below the surface 12. The seismic waves travel to subsurface reflecting horizons. The reflected energy then travels back to the detectors in the streamer 11. Electrical signals thus produced are recorded by suitable recording means on the boat 10 such that the time interval between the generation of each seismic impulse and the arrival of reflected energy can be accurately measured. Such information is then employed to calculate or otherwise determine the depths and attitudes of subsurface reflecting horizons.

It is important that seismic energy employed be of amplitude and of frequency such that it may most expeditiously be sensed and recorded by the exploring system. In accordance with the present invention, a source 20 is provided in which a high energy pump 21, having an inlet 22 extending below the surface 12, is coupled to a downwardly extending pipe 23. The lower end of the pipe 23 includes a valve unit 24. Located along the pipe 23 upstream of the valve 24 is a transmission unit 25.

As best shown in FIGURE 2, the pipe 23 is connected at its lower end to a valve chamber 24, having an opening 26 in the lower end thereof. A flapper valve element 27 is pivoted on an axis 28 and is adapted to be actuated by means of a suitable control system including a hydraulic cylinder 29, which is coupled to the arm 29a of the valve unit.

Spaced upstream of the valve unit 24 is a perforated zone 30. The perforations extend through the wall of the pipe 23 over a predetermined portion of the length thereof. A heavy rubber tube 31 is clamped around the pipe 23 to encompass the perforated zone and is maintained and sealed in place by clamping rings 32 and 33.

The pump 21 is driven by a suitable prime mover, such as an engine or motor (not shown) to propel a high velocity stream of water downward through the pipe 23. At predetermined time intervals, the unit 29 will be actuated as by way of linkage 36 to unlatch the flapper valve element 27 to close part 26. Travel of water through the pipe 23 is abruptly arrested. The energy of the flowing stream is then transmitted through the perforations in the zone 30 and through the rubber tube 31, thereby introducing acoustic energy into the water outside the pipe 23.

By controlling the size of the perforations in the zone 30 and by controlling the character of the resilient tube 31, the energy-frequency spectrum of the resultant seismic waves may be controlled. Further, the amplitude of the seismic wave may be controlled by regulating the amount of energy in the liquid stream, and thus may be fixed by the speed of the pump 21.

It will now be seen that the present invention provides a system for marine seismic exploration wherein a detector streamer is moved along a traverse for detecting seismic energy which is produced at a sending station. A source vessel at the sending station is adapted to be maintained in a predetermined relation to the streamer and is adapted for movement along the traverse. In a preferred form, pump means are provided for directing a high energy flow of water along a confined course, at least a portion of which is submerged in the water body to be excited by seismic waves. Valve means are employed for abruptly terminating such flow in the region of the termination of the path. Structure located at a submerged point along the path, including a resiliently sealed perforated section in the flow path, are provided for transmission of fluid flow energy through the walls of the pipe into the liquid medium for the generation of seismic waves.

Having described the invention in connection with certain specific embodiments thereof, it is to be understood that further modifications may now suggest themselves to those skilled in the art and it is intended to cover such modifications as fall within the scope of the appended claims.

What is claimed is:
1. A source of seismic energy for marine exploration which comprises:
   (a) means including a flow channel for directing a high energy flow of water along said channel toward a portion thereof which is submerged in the water body to be excited,
   (b) means including perforate structure located at a submerged point along said channel for control of the escape of fluid flow energy from said channel, and
   (c) a remotely actuated valve in said channel downstream of said perforate structure for abruptly closing said channel to terminate such flow in said channel.

2. The combination set forth in claim 1 wherein means are provided for terminating said flow of water periodically at time intervals in excess of the two-way travel time of acoustic energy from the surface to the deepest formation of interest.

3. The combination set forth in claim 1 wherein a resilient cover seals said perforate structure.

4. A source of seismic energy for marine exploration which comprises:
   (a) a source vessel,
   (b) a pump mounted on said vessel for picking up water,
   (c) an elongated flow channel leading from said pump to an outlet submerged substantially below the surface of the water and having a perforated section at a location which is submerged and spaced from said outlet,
   (d) a valve at said outlet,
   (e) a resilient cover for said perforated section secured to said flow channel, and
   (f) remotely actuated means for abruptly closing said valve to produce water hammer action in said flow channel, the energy of which is transmitted to the water through said perforated zone and said cover.

References Cited
UNITED STATES PATENTS

| | | | |
|---|---|---|---|
| 719,004 | 1/1903 | Hoffman | 166—177 X |
| 1,080,098 | 12/1913 | Blake | 116—27 |
| 1,504,247 | 8/1924 | Jacques | 181—.5 |
| 2,164,858 | 7/1939 | West | 177—386 |
| 2,693,944 | 11/1954 | Fowle | 259—1 |
| 2,792,804 | 5/1957 | Bouyoucos et al. | 116—137 |
| 3,189,870 | 6/1965 | Roever | 181—.5 |
| 3,189,092 | 6/1965 | Bodine | 166—177 X |
| 3,315,755 | 4/1967 | Brooks | 166—177 |
| 3,318,411 | 5/1967 | Doubt | 181—.5 |

BENJAMIN A. BORCHELT, *Primary Examiner.*

SAMUEL W. ENGLE, *Examiner.*

W. KUJAWA, *Assistant Examiner.*